United States Patent
Revol

(10) Patent No.: US 9,094,109 B2
(45) Date of Patent: Jul. 28, 2015

(54) METHOD AND DEVICE FOR COMPRESSING A WIDE BAND RADIO-NAVIGATION SIGNAL, ASSOCIATED METHOD AND DEVICE FOR CALCULATING THE CORRELATION FUNCTION OF THE SPREADING CODE OF THE COMPRESSED SIGNAL

(71) Applicant: Marc Revol, Upie (FR)

(72) Inventor: Marc Revol, Upie (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/209,932

(22) Filed: Mar. 13, 2014

(65) Prior Publication Data

US 2014/0348210 A1 Nov. 27, 2014

(30) Foreign Application Priority Data

Mar. 15, 2013 (FR) ..................... 13 00579

(51) Int. Cl.
| | | |
|---|---|---|
| H04B 1/00 | (2006.01) |
| H04B 1/709 | (2011.01) |
| G01S 19/09 | (2010.01) |
| G01S 19/24 | (2010.01) |
| G01S 19/37 | (2010.01) |
| G01S 5/00 | (2006.01) |
| H04B 1/7073 | (2011.01) |

(52) U.S. Cl.
CPC ............ *H04B 1/709* (2013.01); *G01S 5/0036* (2013.01); *G01S 19/09* (2013.01); *G01S 19/24* (2013.01); *G01S 19/37* (2013.01); *H04B 1/7073* (2013.01)

(58) Field of Classification Search
USPC ............... 342/357.22, 350, 357.39; 455/12.1, 455/13.2, 3.02; 375/130, 142, 150
See application file for complete search history.

(56) References Cited

U.S. PATENT DOCUMENTS

| | | | |
|---|---|---|---|
| 5,347,285 A * | 9/1994 | MacDoran et al. ...... 342/357.48 |
| 7,436,907 B1 | 10/2008 | Norman | |
| 2007/0257831 A1* | 11/2007 | Mathews et al. ................. 342/22 |
| 2011/0129003 A1* | 6/2011 | Yamagata et al. ............ 375/150 |
| 2012/0169542 A1* | 7/2012 | Mathews et al. .............. 342/450 |

FOREIGN PATENT DOCUMENTS

WO 9504941 2/1995

OTHER PUBLICATIONS

Dr. Chun Yang; Frequency-Domain GPS Baseband Processor Design and Initial Test Results; Proceedings of the Institute of Navigation (ION) GPS; Sep. 11, 2011;Salt Lake City, Utah.
Institute National De La Propriete Industrielle; Frence Search Report; Jan. 10, 2014; Courbevoie, France.

* cited by examiner

*Primary Examiner* — Rahel Guarino
(74) *Attorney, Agent, or Firm* — Michael J. Donohue; Davis Wright Tremaine LLP

(57) ABSTRACT

A method for compressing a wide band satellite radio-navigation signal is disclosed. The wide band signal is compressed in order to transmit it on a narrow band channel. A correlation function is calculated for the spreading code of the compressed satellite radio-navigation signal.

14 Claims, 4 Drawing Sheets

METHOD AND DEVICE FOR COMPRESSING A WIDE BAND RADIO-NAVIGATION SIGNAL, ASSOCIATED METHOD AND DEVICE FOR CALCULATING THE CORRELATION FUNCTION OF THE SPREADING CODE OF THE COMPRESSED SIGNAL

FIELD OF THE INVENTION

The present invention relates to the field of satellite radio-navigation systems. It relates to a method and a device for compressing a wide band radio-navigation signal, such as received by a GNSS receiver, for the purpose of transmitting that compressed signal on a narrow band link. The invention also relates to a method and a device for calculating the correlation function of the spreading code of the said compressed signal when it is received by a receiver.

The French patent application by the Applicant, lodged under the number 12 01709, is incorporated by reference in the present patent application. The aforesaid application 12 01709 describes a satellite navigation system having distributed architecture comprising a plurality of satellite radio-navigation terminals and a central station comprising mutualized means for carrying out the processings on the radio-navigation signal, usually carried out by a terminal, by using the enhanced capabilities of that station.

BACKGROUND OF THE INVENTION

A satellite radio-navigation system comprising a central station in which are remotely carried out some or all of the radio-navigation calculations usually carried out by a receiver necessitates a specific communication link between the GNSS terminals and the central station. This link is typically a narrow band link, for example a VHF link which is limited to a frequency band of less than about one hundred kHz. However, a satellite radio-navigation signal is a wide band signal which necessitates several MHz of bandwidth and its transmission on a narrow band link therefore necessitates an adaptation, in other words a compression, making it possible to transmit all of the useful information contained in the signal on a transmission channel which is not naturally compatible with the wide band of the signal.

A known solution for transmitting a GNSS on a narrow band channel consists of sending data in bursts in a non-continuous manner. This solution necessitates synchronization of the burst transmission with the useful data transmitted by the satellite in order not to cause loss of information.

The invention proposes a solution that is different from the known ones and which makes it possible to continuously transmit a wide band GNSS signal on a narrow band transmission channel by carrying out a compression of that signal. Moreover, the invention also makes it possible to carry out the calculation of the correlation function of the GNSS signal directly on the received compressed signal in an optimum manner.

SUMMARY OF THE INVENTION

The invention thus relates to a method for compressing a wide band satellite radio-navigation signal in order to transmit it on a narrow band channel, the said method being characterized in that it comprises the following steps:
  a step of receiving a satellite radio-navigation signal,
  a step of spectral conversion of the said signal into a plurality N of frequency channels of reduced bandwidth,
  a step of time shifting each of the channelled signals by a predetermined distinct delay, the delay being configured so as to be greater than the duration of the correlation support of the spreading code of a channelled signal,
  a step of accumulation of the shifted channelled signals in order to produce a compressed signal.

According to a particular aspect of the compression method according to the invention, the spectral conversion step is carried out by means of a fast Fourier transform.

According to a particular aspect of the compression method according to the invention, the said predetermined delay is equal to a multiple, different for each of the channelled signals, of a predetermined delay $\Delta T$ of duration greater than the duration of the correlation support of the spreading code of a channelled signal.

According to a particular aspect of the compression method according to the invention, the duration of the correlation support of the spreading code of a channelled signal is equal to the inverse of the width of a frequency channel.

According to a particular aspect of the compression method according to the invention, the plurality N of frequency channels covers the whole of the wide band of the radio-navigation signal.

According to a variant embodiment of the compression method according to the invention, it furthermore comprises a step of selection of a sub-set of M channels from among the plurality N of frequency channels, the said steps of time shifting and of accumulation being carried out solely for the M channelled signals of the said sub-set.

The selection of the said sub-set of M channels can be carried out periodically by a random selection from among the N available channels.

The invention also relates to a method for calculating the correlation function of the spreading code of a satellite radio-navigation signal compressed by application of the compression method according to the invention, characterized in that it comprises the following steps:
  a step of receiving a compressed signal transmitted on a narrow band,
  a step of spectral conversion of a locally generated spreading code into a plurality N of frequency channels,
  a step of time shifting the said received compressed signal by a plurality of predetermined distinct delays in order to obtain a plurality of delayed signals, the said delays being configured so as to be greater than the duration of the correlation support of the channelled spreading code, the number of delayed signals being equal to the number N of frequency channels,
  a step of calculation of the complex conjugate pair product between a delayed signal and a channel of the spectrum of the said locally generated spreading code in order to obtain an intermediate signal,
  a step of calculation of the inverse Fourier transform of the said intermediate signal in order to obtain the correlation function of the spreading code of the said radio-navigation signal.

According to a particular aspect of the calculating method according to the invention, the spectral conversion step is carried out by means of a fast Fourier transform.

According to a particular aspect of the calculating method according to the invention, the said predetermined delays are equal to a multiple, different for each delay, of a predetermined delay $\Delta T$ of duration greater than the duration of the correlation support of the channelled spreading code.

The invention also relates to a device for compressing a wide band satellite radio-navigation signal in order to transmit it on a narrow band channel, characterized in that it comprises:
- a means for spectrally converting the said signal into a plurality N of frequency channels of reduced bandwidth,
- means for time shifting each of the channelled signals by a predetermined distinct delay, the delay being configured so as to be greater than the duration of the correlation support of a channelled signal,
- means for accumulating the said shifted channelled signals in order to produce a compressed signal.

The invention also relates to a transmitting terminal comprising means for receiving a satellite radio-navigation signal, a device for compressing the said satellite radio-navigation signal according to the invention and means for transmitting the said compressed signal on a narrow band channel.

The invention also relates to a device for calculating the correlation function of the spreading code of a satellite radio-navigation signal, characterized in that it comprises:
- a means of spectral conversion of a locally generated spreading code into a plurality N of frequency channels,
- means of time shifting the said radio-navigation signal by a plurality of predetermined distinct delays in order to obtain a plurality of delayed signals, the said delays being configured so as to be greater than the duration of the correlation support of the channelled spreading code,
- means for calculating the complex conjugate pair product between a delayed signal and a channel of the spectrum of the said locally generated spreading code in order to obtain an intermediate signal,
- means for calculating the inverse Fourier transform of the said intermediate signal in order to obtain the correlation function of the spreading code of the said radio-navigation signal.

The invention also relates to a receiving station comprising means for receiving a compressed radio-navigation signal on a narrow band and a device, according to the invention, for calculating the correlation function of the spreading code of the said received compressed radio-navigation signal.

BRIEF DESCRIPTION OF THE DRAWINGS

Other features and advantages of the present invention will become more apparent on reading the following description given with reference to the appended drawings in which.

MORE DETAILED DESCRIPTION

Figure 1:
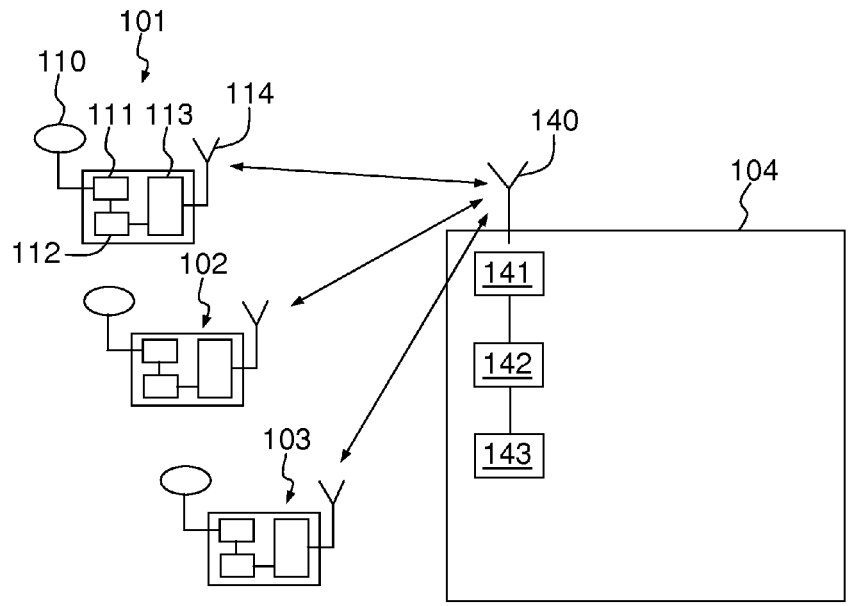
FIG. 1 shows a diagram of a satellite radio-navigation system comprising a plurality of GNSS terminals adapted, according to the invention, to communicate with a central calculating station.

FIG. 1 describes, in a block diagram, a satellite radio-navigation system such as described in the prior application 12 01709 which comprises a plurality of receivers 101,102, 103 able to receive satellite radio-navigation signals transmitted by the satellites that can be seen by the said receivers and a calculating station referenced 104 which carries out a set of processings for the determination of navigation data (PVT) in a centralized manner in order, on the one hand, to make it possible to reduce the complexity of the processings implemented in the receivers 101,102,103 and, on the other hand, to secure the reception processing of the signals, in particular in the case of encrypted signals. These processings notably include the extraction of raw measurements of code phase and of carrier phase as well as the demodulation of the navigation messages.

Each receiver 101,102,103 comprises an antenna 110 for receiving satellite radio-navigation signals, an RF module 111 for receiving the said signals and for transposition to an intermediate frequency and an analogue to digital converter, a module 112, according to the invention, for compressing the received radio-navigation signal and means for narrow band communication 113, for example in a VHF frequency band, adapted to transmit the radio-navigation signals compressed according to the invention and transposed into intermediate frequency or into baseband to the station referenced 104. For this purpose, each receiver 101,102,103 also comprises an antenna 114 for the transmission of the compressed signals obtained at intermediate frequency or in baseband to the station referenced 104.

The station referenced 104 comprises at least one transmitting/receiving antenna 140 making it possible to communicate with the receivers 101,102,103 via a narrow band communication link. The antenna 140 is for example a VHF antenna. It also comprises receiving means 141 associated with the VHF antenna for receiving the compressed signal transmitted by the receivers on the VHF link. The station referenced 104 also comprises a module 142 for calculating the correlation function of the spreading code of the received compressed signal and calculating means 143 in order to establish position, velocity and time (PVT) information, notably from the correlation function.

Figure 2:
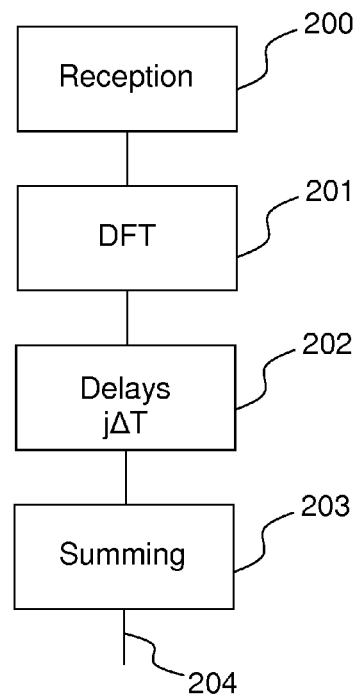
FIG. 2 shows a flowchart of the method, according to the invention, for compressing a wide band radio-navigation signal in order to transmit it on a narrow band transmission channel.

FIG. 2 shows a flowchart of the method for compressing a radio-navigation signal according to the invention. This method can be executed by the compression module 112 which comprises a receiver 101,102,103.

The compression method according to the invention comprises at least one step 200 of receiving a satellite radio-navigation signal, by means of receiving means comprising at least one GNSS antenna.

In a step 201, a spectral conversion of the received signal is carried out, for example by means of a direct fast Fourier transform. Advantageously, this operation is carried out on the digitized signal using a discrete Fourier transform. Its purpose is to carry out a division of the wide band of the GNSS signal into a plurality of channels having narrower frequency bands. The number of channels is chosen such that the frequency band of a channel is at most equal to the band of frequencies available on the selected transmission channel. At the output of step 201, the radio-navigation signal is therefore broken down into a plurality of signals channelled in a frequential manner.

In a step 202, a different time delay is applied to each of the channelled signals for the purpose of producing a time interlacing of those signals so that their correlation functions are not superimposed on reception, which would cause interference and finally a loss of information. Advantageously, the time delay can be equal to j·ΔT, where j is a different positive integer for each channelled signal and ΔT is a predetermined fixed time delay at least greater than the duration of the correlation support of the spreading code of the signal. The expression "correlation support" denotes the time domain in which the correlation function of the spreading code of the GNSS signal is not zero. For example, the basic spreading code of the GPS C/A radio-navigation signals is a periodic sequence of 1023 pseudo-random states of the phase of the signal. A state corresponds to a 0 or π modulation of the phase of the carrier, each of the states having a duration of 1 μs. The length of a spreading code sequence in this case is equal to 1.023 ms.

Because of the pseudo-random structure of the spreading code used for a GPS C/A radio-navigation signal, the correlation function of such a code is a "triangle" function having its maximum for a zero delay and being cancelled out for delays greater than a duration of 1 μs.

As the code is periodic, this correlation function is itself periodic and has the same period of 1.023 ms. In this case, the correlation support is of duration equal to 1 μs. It therefore suffices for two signals to be shifted by more than 1 μs (but by less than 1 ms because of the periodicities), in order for them not to be correlated.

In practice, as the signal was channelled during step 201 into sub-bands of reduced spectral width, it is sufficient for the time delay ΔT to be at least greater than 1/Δf, where Δf is the bandwidth of a channel. In fact, the correlation support of the filtered spreading code is substantially equal to 1/Δf.

Thus, the channelled signals are mutually time shifted with respect to each other by a delay at least greater than the correlation support of the filtered spreading code in each analysis channel. This time superimposition of the signals does not involve any ambiguity on reception because of the shifting of the correlation functions and allows the recomposition of the waveform of the wide band signal.

For example, the integer j can be chosen such that two signals channelled according to two adjacent frequency channels are delayed by the delay ΔT. As a spreading code has a limited support, interference between the spreading codes of two channelled signals transmitted successively with a delay at least equal to ΔT is thus avoided.

In a step 203, the different channelled and delayed signals are summed in order to produce a unique compressed signal 204 necessitating a frequency band at most equal to the band of one channel for its transmission.

Figure 3:
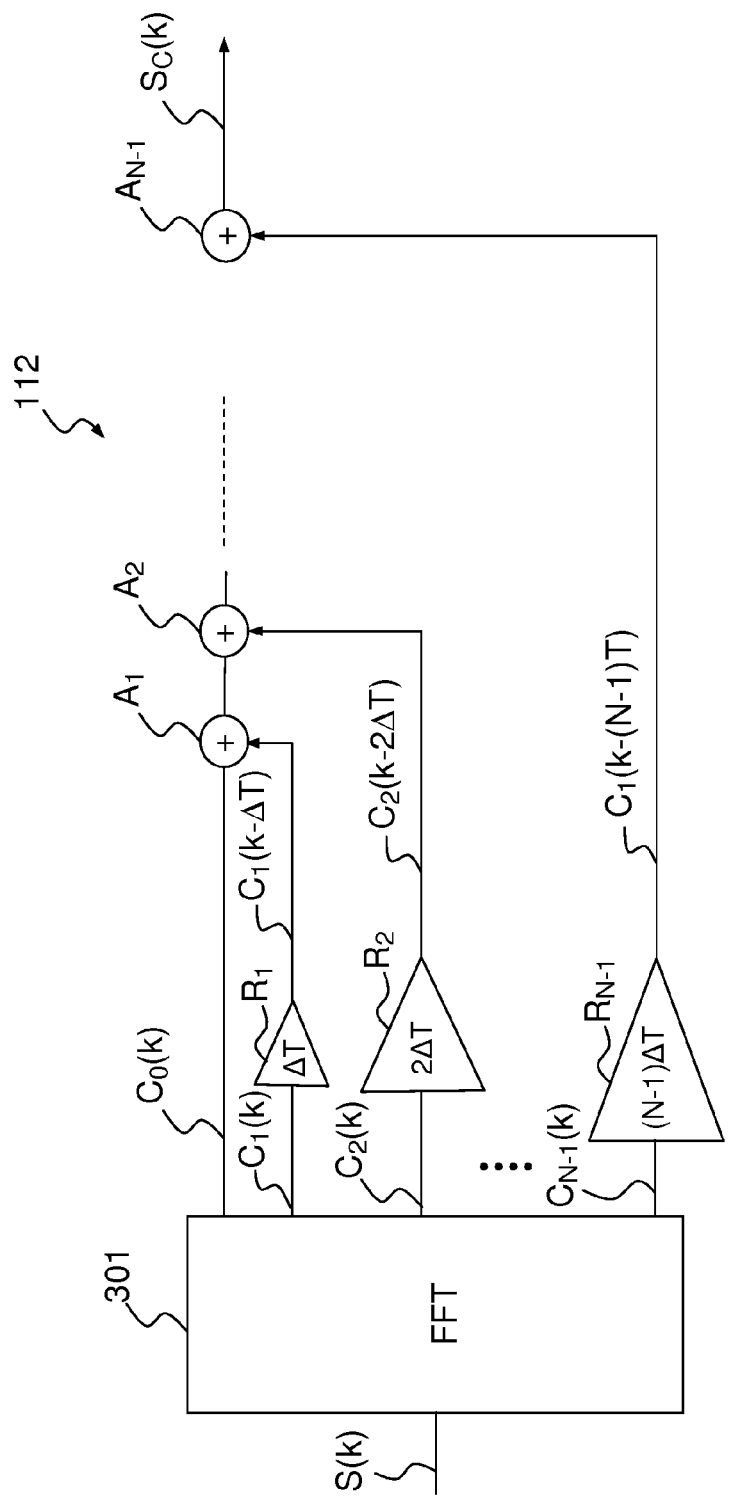
FIG. 3 shows a block diagram of a compression module, intended to be implemented in a transmitting terminal and comprising means adapted to use the method described in FIG. 2.

FIG. 3 shows a block diagram of a compression device 112 intended to be implemented in a GNSS terminal 101,102,103 and comprising means adapted to use the method described in FIG. 2.

The compression device 112 receives at its input at time k the previously digitized satellite radio-navigation signal S(k) and produces at its output a compressed signal $S_c(k)$ for transmission by means of narrow band communication means 113.

The compression device 112 comprises a first fast Fourier transform module 301 which delivers at its output a plurality N of channelled signals $C_0(k), C_1(k), C_2(k) \ldots C_{N-1}(k)$. The channelled signal $C_j(k)$ produced on the channel of index j, where j is an integer included between 0 and N−1, can be represented by means of the following expression:

$$C_j(k) = \frac{1}{N} \sum_{n=1}^{N} S(k+n) \exp\left(-1 i\pi \frac{j \cdot n}{N}\right)$$

The compression device 112 furthermore comprises means $R_1, R_2, \ldots R_{N-1}$ for delaying at least N−1 channelled signals at the output of the first module 301 by a delay j·ΔT that is different for each channel. For example, a possible arrangement of the delays consists in not delaying the first channelled signal $C_0(k)$, in delaying the second channelled signal $C_1(k)$ by a delay equal to ΔT, in delaying the third channelled signal $C_2(k)$ by a delay equal to 2ΔT and so on. Any other arrangement can be envisaged provided that the delays are all different from one channel to the other.

The compression device 112 furthermore comprises accumulators $A_1, A_2 \ldots A_{N-1}$ for summing the said shifted channelled signals $C_0(k), C_1(k), C_2(k), \ldots C_{N-1}(k)$ together in order to produce the compressed signal $S_c(k)$ which is written by means of the following expression:

$$S_c(k) = \sum_{j=0}^{N-1} C_j(k - j\Delta T)$$

Figure 4:
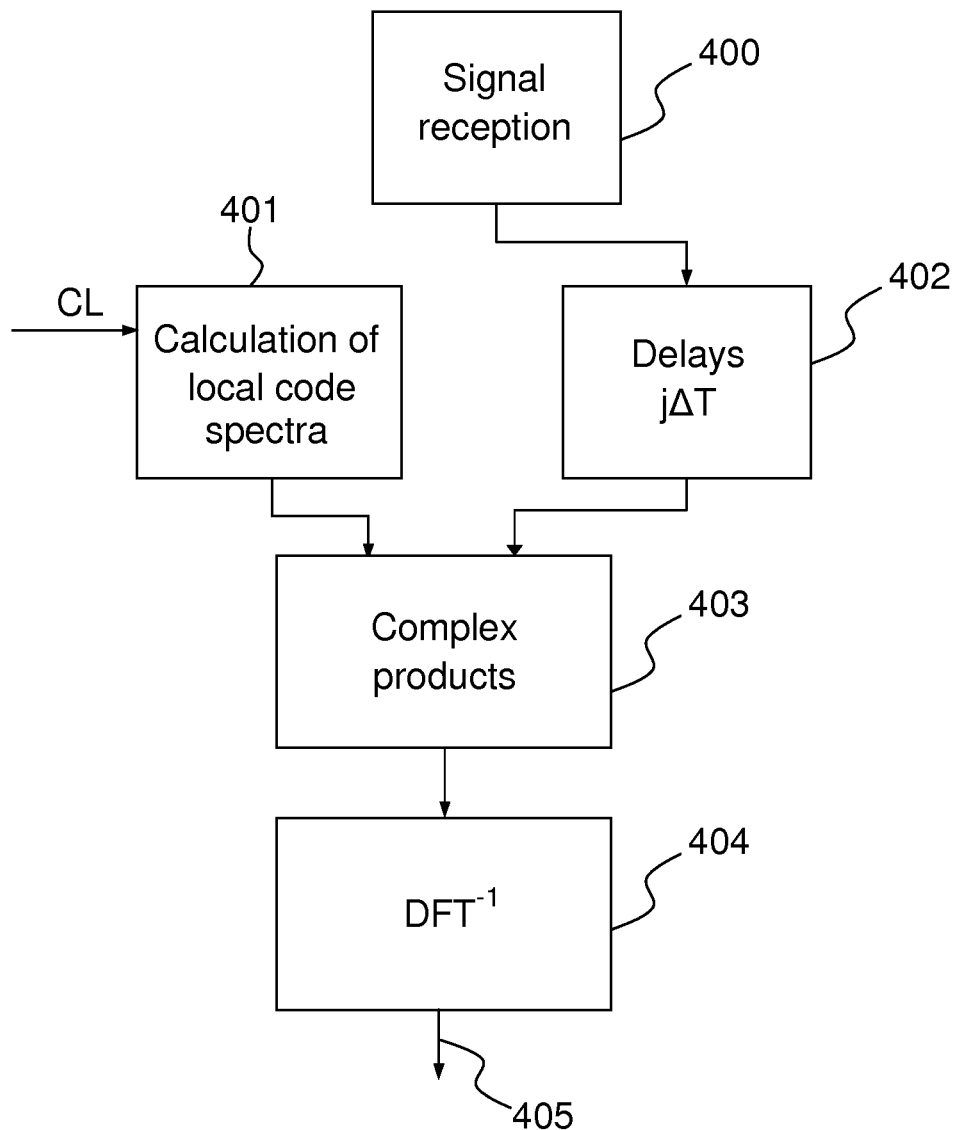
FIG. 4 shows a flowchart of the method, according to the invention, for calculating the correlation function of the spreading code of a radio-navigation signal compressed according to the method shown in FIG. 2.

FIG. 4 shows a flowchart of the method, according to the invention, for calculating the correlation function of the spreading code of a radio-navigation signal compressed according to the method shown in FIG. 2.

Such a method is executed by a receiving terminal or a receiving station comprising means for communicating with a transmitting GNSS terminal through a narrow band channel.

The calculating method according to FIG. 4 comprises at least a step 400 of reception of a radio-navigation signal compressed according to the compression method described in FIG. 2.

It comprises moreover a step 401 of calculating, from a locally generated spreading code, spectra of this local code in the different frequency bands corresponding to the frequency channellings carried out on the radio-navigation signal during its compression. This step can, for example, be carried out by applying a direct Fourier transform to the sequence of the locally generated spreading code of the same type as the one applied during the execution of the compression method by the device 112.

In a step 402, the signal received in step 400 is delayed by a plurality of delays that are different from each other in order to generate a plurality of delayed signals. The delays applied must correspond to the delays used for generating the compressed signal by application of the method according to FIG. 2.

Advantageously, the time delays can be equal to j·ΔT, where j is a different positive integer for each delayed signal and ΔT is a predetermined fixed time delay at least greater than the duration of the correlation support of the spreading code of the signal. For example, the integer j can be chosen such that two consecutive delayed signals are delayed by the delay ΔT.

In a step 403, a complex pair product is produced between a spectrum obtained at the output of step 401, after complex conjugation, and a delayed signal obtained at the output of step 402. Advantageously, each delay is associated with a frequency channel according to an arrangement that is identical to the one used during the compression of the radio-navigation signal according to the method shown in FIG. 2. The convolution product is produced complying with this association.

In a step 404, an inverse Fourier transform is applied to the signal constituted by the different convolution products obtained at the output of step 403 in order to obtain the result of the correlation 405 between the locally generated spreading code and the radio-navigation signal.

Figure 5:
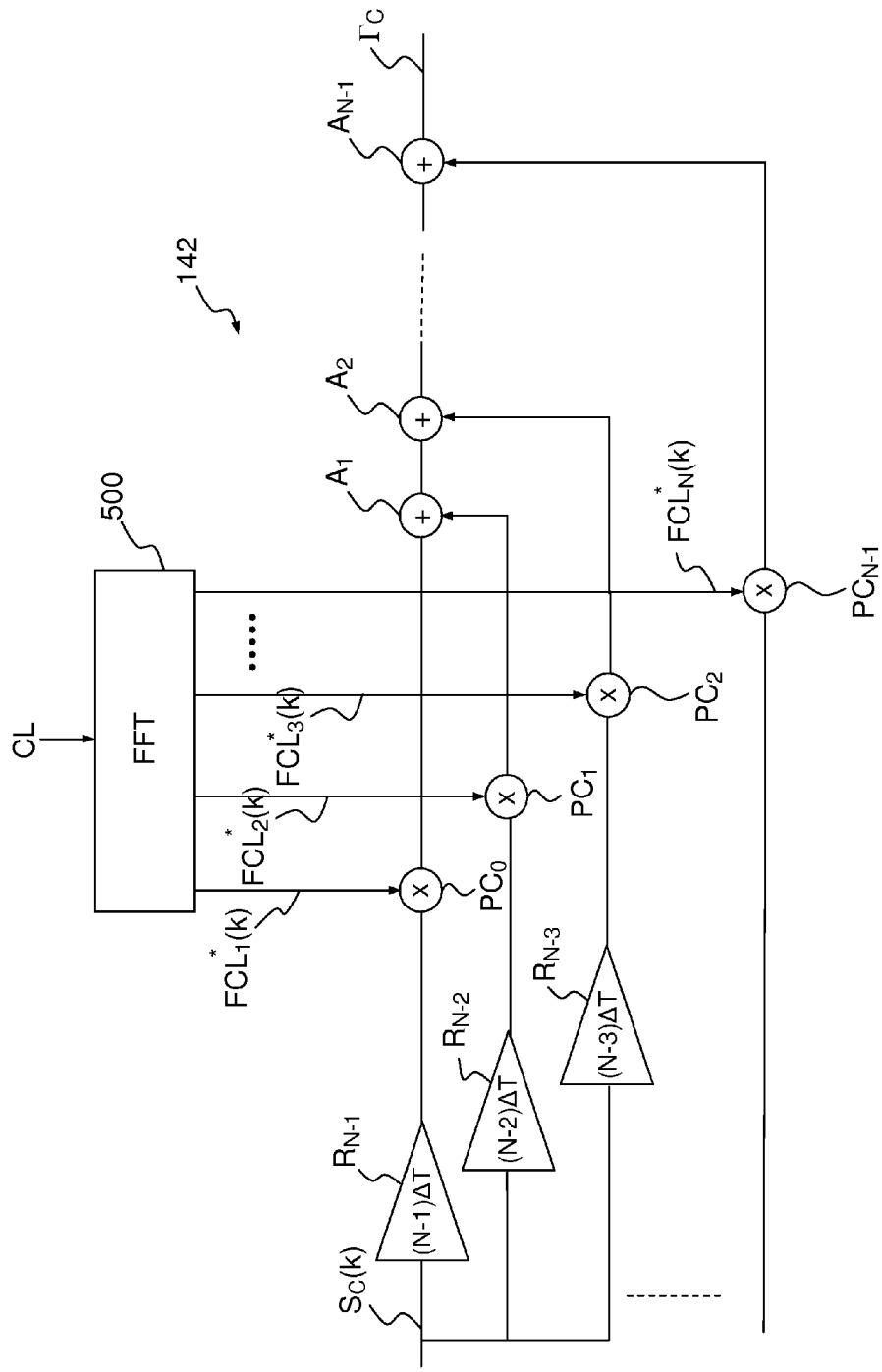
FIG. 5 shows a block diagram of a correlation module intended to be implemented in a receiving terminal and comprising means adapted to use the method described in FIG. 4.

FIG. 5 shows a block diagram of a correlation module intended to be implemented in a receiving terminal and comprising means adapted to use the calculation method described in FIG. 4.

The correlation module 142 receives at its input a compressed and digitized radio-navigation signal $S_c(n)$. It comprises a first direct Fourier transform module 500 which receives at its input a replica of the sequence of a locally generated spreading code CL and produces at its output a plurality of channelled signals $FCL_1^*(k), \ldots, FCL_N^*(k)$.

The correlation module 142 furthermore comprises means $R_1, R_2, \ldots R_{N-1}$ for delaying the received signal by a plurality of different delays $j\Delta T$. For example, a possible arrangement of the delays consists in producing N−1 delayed signals from the received signal, each signal being delayed by a delay that is a different multiple of $\Delta T$. Any other arrangement can be envisaged provided that the delays are all different from each other and correspond to the delays used for generating the compressed signal.

The correlation module 142 also comprises calculating means $PC_0, PC_1, \ldots PC_{N-1}$ for producing a complex product between a channelled signal at the output of the first module 500, after complex conjugation, and a delayed signal.

Advantageously, the delays are produced so as to compensate for the delays used during the compression of the radio-navigation signal.

In other words, again taking the example given above with reference to FIG. 3, if delays applied on transmission on the channels of index 0 to N−1 are respectively equal to 0, $\Delta T$, $2\Delta T$, ..., $(N-2)\Delta T$, $(N-1)\Delta T$ then the delays applied on reception by the correlation module 142 in order to reconstitute the channels of index 0 to N−1 must respectively be equal to $(N-1)\Delta T$, $(N-2)\Delta$, ..., $2\Delta T$, $\Delta T$, 0.

More generally, the delays applied by the correlation module 142 are configured so that, for each channel of index 0 to N−1, the delay $\tau'$ applied is equal to $\tau$-$M\Delta T$ where $\tau$ is the delay applied for the same channel during the compression of the signal and $M\Delta T$ is a constant delay whatever the channel of index 0 to N−1 may be and at least equal to the longest delay applied during the compression of the signal.

The correlation module 142 finally comprises means for producing an inverse Fourier transform of the signal composed of the outputs of each complex product. Advantageously, the inverse Fourier transform can be produced by integrating in the calculation of the complex product a multiplication by the term $\exp(2i\pi(jk/N))$ and by using a series of adders $A_1, A_2 \ldots A_{N-1}$ for accumulating the different terms. More precisely, the term $FCL_j^*(k)$ is multiplied by the term $\exp(2i\pi(jk/N))$.

The final result of the correlation calculation can be represented by the following expression:

$$\Gamma_c(0) = \sum_{j=0}^{N-1} (FCL_j^*(k) \otimes S_c(k - j\Delta T)) \exp\left(2i\pi \frac{jk}{N}\right)$$

This result is identical to the one that would be obtained by carrying out a direct correlation between the locally generated spreading code and the wide band (non-compressed) radio-navigation signal because the minimum shift $\Delta T$ between two channelled signals is greater than or equal to the duration of the correlation support of the filtered spreading code in each narrow band channel. Thus, there is no interference between the correlation calculations carried out for each channelled signal.

The abovementioned correlation calculation can advantageously be used within a time synchronization loop of the spreading code. In particular, the correlation function can be calculated for different values of delay or of advance of the received signal and can feed a spreading code discriminator.

In a variant embodiment of the invention, the compression of the wide band radio-navigation signal, such as is explained in FIGS. 2 and 3, can be carried out by selecting a sub-set of the frequency channels at the output of the channelling step 201. For example, a predetermined number M of channels can be selected from among the N channels available which cover the whole of the useful bandwidth. In this case, only the M channelled signals corresponding to the selected channels are used for the generation of the compressed signal. In other words, only these M signals are delayed (step 202) and accumulated (step 204). This variant makes it possible to limit the complexity of the processings but also to combat possible frequency-selective interference having an impact on the radio-navigation signal. Advantageously, the M selected channels can be chosen according to a random selection carried out periodically in order that all of the channels covering the useful band of the GNSS signal are used by the end of a given period of time. Any other selection can be envisaged depending on the radio constraints or on the complexity of implementation.

According to this variant of the invention, the M channels used on transmission must be communicated to the receiver in order to carry out the calculation of the correlation function by selecting the same frequency channels.

The compression device and the module for calculating the correlation function according to the invention can be produced by hardware and/or software means. For example, the fast Fourier transform calculations can be carried out by a software calculator and the delays can be produced by delay lines.

The invention claimed is:

1. A method for compressing a wide band satellite radio-navigation signal in order to transmit it on a narrow band channel, said method comprising:
   receiving a satellite radio-navigation signal,
   performing a spectral conversion of said satellite radio-navigation signal into a plurality N of frequency channels of reduced bandwidth,
   time-shifting each of the channelled signals by a predetermined distinct delay, the delay being configured so as to be greater than a duration of a correlation support of a spreading code of a channelled signal, and
   accumulating the shifted channelled signals in order to produce a compressed signal.

2. The method of claim 1, wherein the spectral conversion is carried out using a fast Fourier transform.

3. The method of claim 1, wherein the predetermined delay is equal to a multiple, different for each of the channelled signals, of a predetermined delay $\Delta T$ of duration greater than the duration of the correlation support of the spreading code of a channelled signal.

4. The method of claim 3, wherein the duration of the correlation support of the spreading code of a channelled signal is equal to an inverse of a width of a frequency channel.

5. The method of claim 1, wherein the plurality N of frequency channels covers the whole of the wide band of the radio-navigation signal.

6. The method of claim 1, furthermore comprising selecting a sub-set of M channels from among the plurality N of frequency channels, said time shifting and accumulation being carried out solely for the M channelled signals of said sub-set.

7. The method of claim 6, wherein the selection of said sub-set of M channels is carried out periodically by a random selection from among the N available channels.

8. A method for calculating a correlation function of the spreading code of a satellite radio-navigation signal compressed according to a method for compressing a wide band satellite radio-navigation signal in order to transmit it on a narrow band channel, comprising:
  receiving a satellite radio-navigation signal,
  performing a spectral conversion of said satellite radio-navigation signal into a plurality N of frequency channels of reduced bandwidth,
  time-shifting each of the channelled signals by a predetermined distinct delay, the delay being configured so as to be greater than a duration of a correlation support of a spreading code of a channelled signal, and
  accumulating the shifted channelled signals in order to produce a compressed signal,
said method for calculating a correlation function comprising:
  receiving a compressed signal transmitted on a narrow band,
  performing spectral conversion of a locally generated spreading code into a plurality N of frequency channels,
  time shifting said received compressed signal by a plurality of predetermined distinct delays in order to obtain a plurality of delayed signals, said delays being configured so as to be greater than the duration of the correlation support of the channelled spreading code, the number of delayed signals being equal to the number N of frequency channels,
  calculating a complex conjugate pair product between a delayed signal and a channel of the spectrum of said locally generated spreading code in order to obtain an intermediate signal, and
  calculating an inverse Fourier transform of said intermediate signal in order to obtain the correlation function of the spreading code of said satellite radio-navigation signal.

9. The method of claim 8, wherein the spectral conversion is carried out using a fast Fourier transform.

10. The method of claim 8, wherein said predetermined delays are equal to a multiple, different for each delay, of a predetermined delay $\Delta T$ of duration greater than the duration of the correlation support of the channelled spreading code.

11. A device for compressing a wide band satellite radio-navigation signal in order to transmit it on a narrow band channel, comprising:
  a convertor for spectrally converting said wide band satellite radio-navigation signal into a plurality N of frequency channels of reduced bandwidth,
  a time shifter for time shifting each of the channelled signals by a predetermined distinct delay, the delay being configured so as to be greater than a duration of a correlation support of a channelled signal, and
  an accumulator for accumulating said shifted channelled signals in order to produce a compressed signal.

12. The device of claim 11, further comprising a receiver for receiving the wide band satellite radio-navigation signal and a transmitter for transmitting said compressed signal on the narrow band channel.

13. A device for calculating a correlation function of the spreading code of a satellite radio-navigation signal compressed by spectral conversion of the received satellite radio-navigation signal into a plurality N of frequency channels of reduced bandwidth, time-shifting each of the channelled signals by a predetermined distinct delay, the delay being greater than a duration of a correlation support of a spreading code of a channelled signal, and accumulating the shifted channelled signals in order to generate the compressed signal, said device comprising:
  a convertor for spectral conversion of a locally generated spreading code into a plurality N of frequency channels,
  a time shifter for time shifting the satellite radio-navigation signal by a plurality of predetermined distinct delays in order to obtain a plurality of delayed signals, said delays being configured so as to be greater than a duration of a correlation support of the channelled spreading code,
  a calculator for calculating a complex conjugate pair product between a delayed signal and a channel of the spectrum of said locally generated spreading code in order to obtain an intermediate signal, and
  a calculator for calculating an inverse Fourier transform of said intermediate signal in order to obtain the correlation function of the spreading code of said satellite radio-navigation signal.

14. The device of claim 13, further comprising a receiver for receiving a compressed radio-navigation signal on a narrow band.

* * * * *